US005909910A

United States Patent [19]

Shaffer

[11] Patent Number: 5,909,910

[45] Date of Patent: Jun. 8, 1999

[54] TOOL FOR ATTACHING AND REMOVING T-POST CLIPS

[76] Inventor: Danny Craig Shaffer, Rt. 2, Box 455, Perkins, Okla. 74059

[21] Appl. No.: 09/086,318

[22] Filed: May 28, 1998

[51] Int. Cl.[6] .................... B23P 11/00

[52] U.S. Cl. .................... 29/243.56; 254/25; 29/270; 29/278

[58] Field of Search .................... 29/243.56, 242, 29/243, 270, 278; 254/25, 21, 26 E, 18, 24

[56] References Cited

U.S. PATENT DOCUMENTS

D. 256,442 8/1980 Martin .................... 254/25
949,337 2/1910 Trogner .................... 254/25
1,486,820 3/1924 Wilder .................... 254/25
1,647,576 11/1927 Nowka et al. .................... 254/25
1,903,557 4/1933 Swoyer .................... 254/25
2,087,148 7/1937 Hempy .................... 254/25
5,322,264 6/1994 Giambro .................... 254/25

*Primary Examiner*—David A. Scherbel
*Assistant Examiner*—Lee Wilson
*Attorney, Agent, or Firm*—Molly D. McKay

[57] ABSTRACT

A tool comprising a bar with a pair of teeth proved at one end of the bar and a handle portion attached at the other end of the bar approximately perpendicular to the bar. The teeth are spaced apart from each other in order to allow an end of a t-post clip to removably insert therebetween. The teeth are approximately parallel with the handle and extend outward from the bar in a direction opposite the direction that the handle extends from the bar. The tool is used to twist the ends of t-post clips in order to secure the clips to fence wire in order to secure the fence wire to the t-posts, or alternately, to remove the clips therefrom.

4 Claims, 1 Drawing Sheet

TOOL FOR ATTACHING AND REMOVING T-POST CLIPS

BACKGROUND OF THE INVENTION

1. Field of the Invention

The present invention relates to a tool for attaching and removing a t-post clip to and from a metal t-type fence post or t-post in order to secure fence wire to the t-post and remove fence wire from the t-post.

2. Description of the Related Art

Farmers and ranchers in building fences to surround their fields often use metal t-type fence posts. Metal posts are employed because they are strong and will not deteriorate as quickly as traditional wooden fence posts.

Metal t-post clips are used to secure fence wire to the metal t-posts in order to create a fence with these metal t-posts. These metal t-post clips are short pieces of wire having a first end provided with a hook formed therein and having an opposite second end that is curved. In order to secure fence wire to a metal t-post with a t-post clip, the hook on the first end of the t-post clip is placed around the fence wire that is to be secured to the t-post. Then the curved end of the clip is pulled behind the post and back to the front of the post on the opposite side where it is then hooked to the fence wire which is positioned between raised bumps provided on the front side of the t-post. In order to secure the clip around the fence wire, the curved end of the clip is normally grasped by a pair of pliers and twisted around the fence wire so that the clip will not come loose from the fence wire. The person installing the t-clip may also then grasp the hook end of the clip with the pliers and also twist the hook end around the fence wire to make sure this end of the clip will not come loose from the fence wire.

In order to remove the fence wire from the t-post, this procedure is reversed, with the user again grasping the end of the t-clip previously twisted with pliers and bending the clip in the opposite direction to remove the clip from the fence wire and t-post.

The problem with this procedure is that the person who is building the fence will normally be wearing work gloves and it is difficult to handle a pair of pliers with gloves on. Thus, the workman who is building the fence must either try to awkwardly use the pliers with his gloves on or must constantly be taking his gloves on and off. The present invention solves this problem by providing a tool that does not require the user to grasp a pair of handles, such as found on pliers, but instead has only a single fixed handle that can be easily grasp by a gloved hand. The tool is provided with teeth that can be made to engage the clip easily and can be used by someone who is wearing gloves to easily and quickly secure a clip to fence wire around a t-post or to remove a clip therefrom.

SUMMARY OF THE INVENTION

The present invention is a tool 10 consisting of a bar 12. The bar 12 is provided on a first end 14 with two teeth 16 and 18 that are approximately parallel to each other, and the teeth 16 and 18 extend at a right angles outward from the bar 12. The teeth 16 and 18 are separated from each other a sufficient distance to allow an end 20 or 22 of a t-post clip 24 to snuggly, but removably insert between the teeth 16 and 18.

An opposite second end 26 of the bar 12 is provided with a handle portion 28 that extends outward from the bar 12 at approximately a right angle from a longitudinal axes 30 of the bar 12. The handle portion 28 is preferably approximately parallel with the teeth 16 and 18 and extends outward from the bar 12 so that the handle portion 28 extends outward from the bar 12 in a direction opposite the direction that the teeth 16 and 18 extend from the bar 12.

In order to use the tool 10, the teeth 16 and 18 are engaged with one end, either 20 or 22, of the t-post clip 24 by inserting the end, either 20 or 22, between the teeth 16 and 18. The handle portion 28 is then grasped in order to twist the end, either 20 or 22, so that the clip 24 may be tightened to fence wire 32 in order to secure the fence wire 32 to a metal t-post 34. Or, alternately, if the handle portion 28 is twisted in the opposite direction, the clip 24 may be loosened from the fence wire 32 in order to remove the fence wire 32 from a metal t-post 34.

DETAILED DESCRIPTION OF THE PREFERRED EMBODIMENT INVENTION

Figure 1:
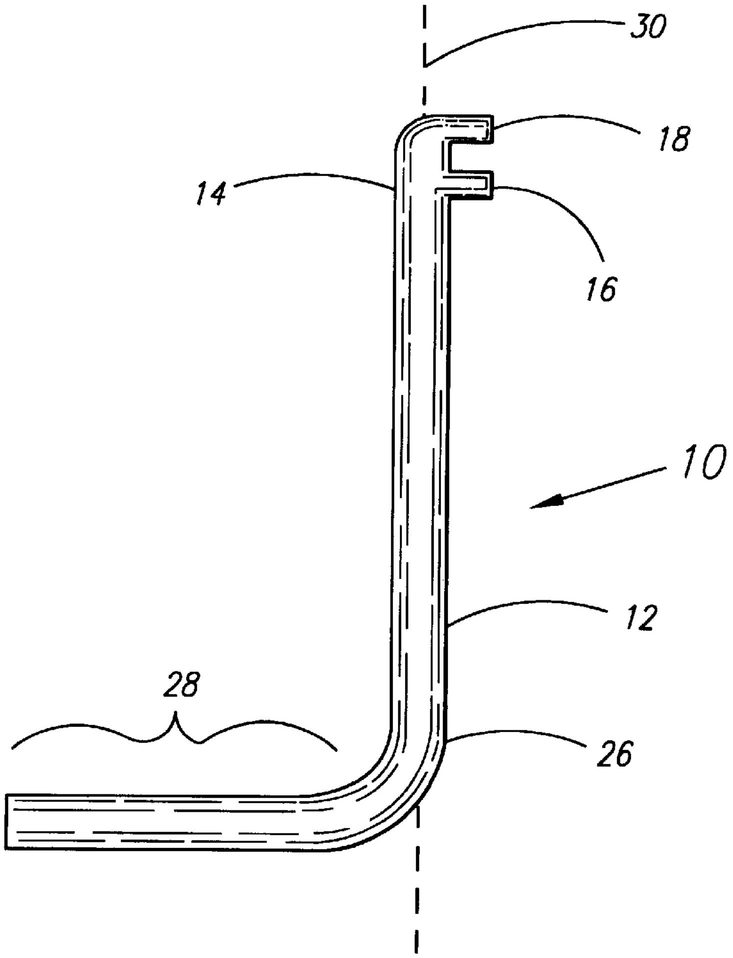
FIG. 1 is a perspective view of a tool constructed in accordance with a preferred embodiment of the present invention.

Referring now to the drawings and initially to FIG. 1, there is illustrated a preferred embodiment of the present invention. The present invention is a tool 10 consisting of a bar 12. The bar 12 is provided on a first end 14 with two teeth 16 and 18 that are approximately parallel to each other, and teeth 16 and 18 extend at approximately a right angle outward from the bar 12. The teeth 16 and 18 are separated from each other a sufficient distance to allow an end, 20 or 22, of a t-post clip 24 to snuggly, but removably, insert between the teeth 16 and 18.

An opposite second end 26 of the bar 12 is provided with a handle portion 28 that extends at approximately a right angle from a longitudinal axis 30 of the bar 12. The handle portion 28 is approximately parallel with the teeth 16 and 18 and extends outward from the bar 12 so that the handle portion 28 extends outward from the bar 12 in a direction opposite the direction that the teeth 16 and 18 extend from the bar 12.

Figure 2:
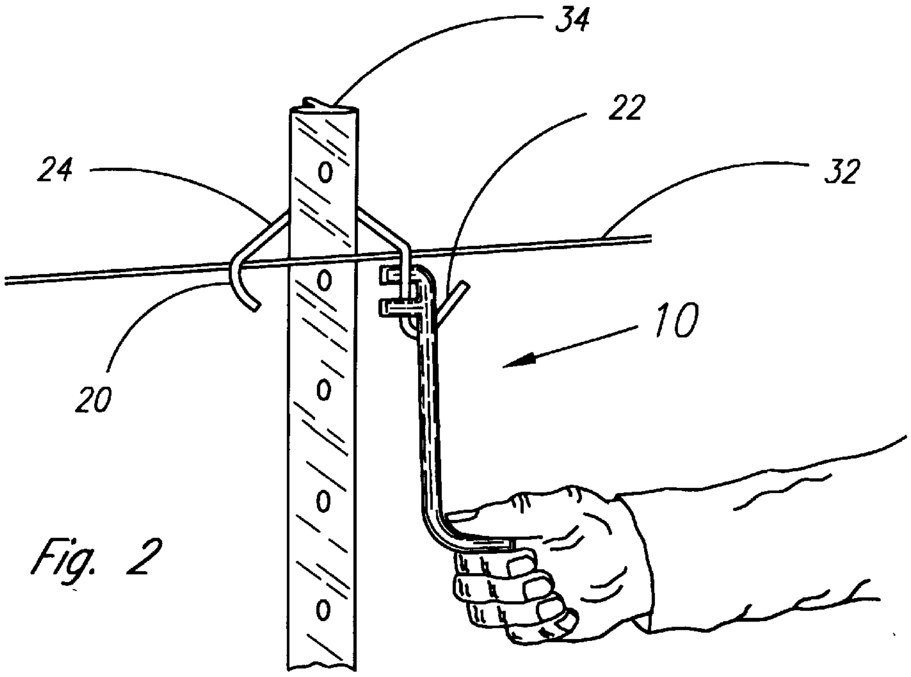
FIG. 2 is a perspective view of the invention, showing the invention being used to secure fence wire to a t-post by means of a t-post clip.

Referring now to FIG. 2, use of the tool 10 is illustrated. In order to use the tool 10, the teeth 16 and 18 are engaged with one end, either 20 or 22, of the t-post clip 24 by inserting the end, either 20 or 22, between the teeth 16 and 18. The handle portion 28 is then grasped in order to twist the end, either 20 or 22, so that the clip 24 may be tightened to fence wire 32 in order to secure the fence wire 32 to a metal t-post 34, or alternately, so the clip 24 may be loosened from the fence wire 32 in order to remove the fence wire 32 from a metal t-post 34.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A tool for attaching and removing t-post clips comprising a straight bar having a first end and an opposite second end, a longitudinal axis of the bar extending between the two opposite ends, and two spaced apart teeth provided on said first end of the bar so that the teeth attach to the bar along the longitudinal axis, said teeth attaching directly to said bar, said teeth being approximately parallel to each other along their entire length, said teeth extending outward from the bar approximately perpendicular to the longitudinal axis, and said teeth separated from each other a sufficient distance to admit an end of a t-post clip to be removably received therebetween.

2. A tool according to claim 1 further comprising a handle portion attaching directly to said second end of the bar, said handle portion being approximately perpendicular to said longitudinal axis, said handle portion being approximately parallel to said teeth and extending outward from the bar in a direction opposite to a direction that the teeth extend outward from the bar.

3. A tool for attaching and removing t-post clips comprising a straight bar having a first end and an opposite second end, and two approximately parallel spaced apart teeth attaching directly to a first end of the bar so that the teeth attach to the bar along the longitudinal axis and extend outward therefrom.

4. A tool according to claim 3 further comprising a handle portion provided extending outward from said second end of said bar in a direction opposite the teeth.

* * * * *